(12) United States Patent
Nordman et al.

(10) Patent No.: US 10,899,425 B2
(45) Date of Patent: Jan. 26, 2021

(54) DOOR FRAME STABILIZATION

(71) Applicant: THE BOEING COMPANY, Chicago, IL (US)

(72) Inventors: Paul S. Nordman, Everett, WA (US); Eder A. Martins, Snohomish, WA (US); Justin David Boynton Malcolm, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 381 days.

(21) Appl. No.: 16/041,273

(22) Filed: Jul. 20, 2018

(65) Prior Publication Data

US 2020/0023935 A1    Jan. 23, 2020

(51) Int. Cl.
*B64C 1/14* (2006.01)
*E05F 5/00* (2017.01)
*B64C 1/00* (2006.01)

(52) U.S. Cl.
CPC .............. *B64C 1/1461* (2013.01); *E05F 5/00* (2013.01); *B64C 2001/0072* (2013.01); *E05Y 2900/502* (2013.01)

(58) Field of Classification Search
CPC ... B64C 1/1461; B64C 1/1407; B64C 1/1415; B64C 1/1423; B64C 2001/0072; E05F 5/00; E05Y 2900/502
See application file for complete search history.

(56) References Cited

U.S. PATENT DOCUMENTS

| | | | |
|---|---|---|---|
| 2003/0141415 A1* | 7/2003 | Leclerc | B64C 1/1407 244/129.5 |
| 2009/0146008 A1* | 6/2009 | Thiele | B64C 1/068 244/119 |
| 2012/0211602 A1 | 8/2012 | Dugerie et al. | |
| 2016/0023779 A1* | 1/2016 | Gehlsen | B32B 43/00 29/897.2 |
| 2016/0280354 A1* | 9/2016 | Hegenbart | B64C 1/1461 |
| 2019/0135405 A1* | 5/2019 | Jorn | B64C 1/1461 |

* cited by examiner

Primary Examiner — Rodney A Bonnette
(74) Attorney, Agent, or Firm — Marshall, Gerstein & Borun LLP (57) ABSTRACT

A stabilization assembly for a door frame secured to a fuselage skin of an aircraft and positioned about an opening defined in the fuselage skin including a strap, wherein a first end portion of the strap is secured to the fuselage skin with a first fastener which extends through the first end portion of the strap and through at least a portion of the fuselage skin. A second end portion of the strap is coupled to the door frame and a third portion of the strap extends between the first and second end portions of the strap and spaced apart from the fuselage skin.

27 Claims, 9 Drawing Sheets

DOOR FRAME STABILIZATION

FIELD

This disclosure relates to a door frame associated with a door which provides access through a fuselage from outside of the fuselage into a cabin of an aircraft, and more particularly, a stabilization assembly to provide stabilization to the door frame, with the door in a closed position during flight operations.

BACKGROUND

Accessing a cabin of an aircraft is typically done through a doorway positioned through the fuselage structure of the aircraft. The fuselage often includes a reinforced skin structure. A door frame is secured to the fuselage of the aircraft and is positioned to extend about a perimeter of the opening in the fuselage skin. The door frame includes frame stops secured to the door frame and extending in a direction into the opening in the fuselage. The frame stops are positioned spaced apart from one another along the door frame. A door includes door stops secured to the door and positioned about the door wherein each frame stop aligns with a corresponding door stop with the door in a closed position within the door frame during flight operations of the aircraft. Force loads experienced by the door are transmitted through the door stops to the frame stops during flight operations.

Force loads are exerted onto the door with the aircraft in flight. The interior or cabin air pressure of the aircraft becomes relatively greater than the air pressure positioned on the outside of the aircraft. As the aircraft gains altitude, a pressure differential increases between the cabin and the outside of the aircraft. This pressure differential causes an applied force load to be exerted on the cabin side of the door in a direction toward the outside of the aircraft. This applied force that is exerted on the door is transmitted from the door stops of the door to the door frame stops. With the door frame stops positioned extending in a direction within the opening of the doorway the door frame stops are positioned offset from the door frame. The door stops exert a force onto the frame stops and the frame stops in turn exert the load onto the door frame. The load exerted onto the door frame includes the shear force from the applied force load exerted on the door from the pressure differentiation and includes an overturning moment exerted on the door frame. The overturning moment is exerted on the door frame in a rotational direction extending from the interior of the fuselage skin toward the opening in the fuselage skin which the door frame surrounds.

It has been a practice to employ an intercostal or rib member in securement to the door frame to provide stabilization to the door frame with the applied force imparted on the door which results in a shear force and the overturning moment being imparted onto the door frame. A first end of the intercostal was bolted to the door frame and an opposing second end of the intercostal was secured to an adjacent frame member of the fuselage structure adjacent to the door frame. The intercostal included a panel or panel assembly construction positioned between the door frame and the adjacent frame member. The intercostal and the bolts that secured the intercostal to the door frame took on a majority of the shear force and the resulting overturning moment from the applied force imparted to the door. As a result, the intercostal had a robust construction that included a relatively heavy weight. In addition, in securing the intercostal within the fuselage skin at the second opposing end, the intercostal was connected, as mentioned above, to the adjacent frame to the door frame. This securement included geometric challenges for installation of the intercostal to the adjacent frame in the fuselage skin which resulted in the securement being time consuming and costly.

As a result, there is a need to provide a stabilization assembly for a door frame and a method for stabilizing a door frame which will include a stabilization assembly that is less robust and would include less of a weight burden to the aircraft. There is also a need to provide a stabilization assembly of the door frame and a method of stabilizing the door frame that will require less time and cost for installation.

SUMMARY

An example includes a stabilization assembly for a door frame secured to a fuselage skin of an aircraft and positioned about an opening defined in the fuselage skin. The stabilization assembly includes a strap, wherein a first end portion of the strap is secured to the fuselage skin with a first fastener which extends through the first end portion of the strap and through at least a portion of the fuselage skin. A second end portion of the strap is coupled to the door frame and a third portion of the strap extends between the first and second end portions of the strap spaced apart from the fuselage skin.

An example includes a method for stabilizing a door frame secured to a fuselage skin of an aircraft and positioned about an opening defined in the fuselage skin, including the step of securing a first end portion of the strap to the fuselage skin with a first fastener which extends through the first end portion of the strap and through at least a portion of the fuselage skin. The method further includes the step of securing a second end portion of the strap coupled to the door frame with a third portion of the strap which extends from the first end portion to the second end portion spaced apart from the fuselage skin.

The features, functions, and advantages that have been discussed can be achieved independently in various embodiments or may be combined in yet other embodiments further details of which can be seen with reference to the following description and drawings.

DESCRIPTION

Figure 1:
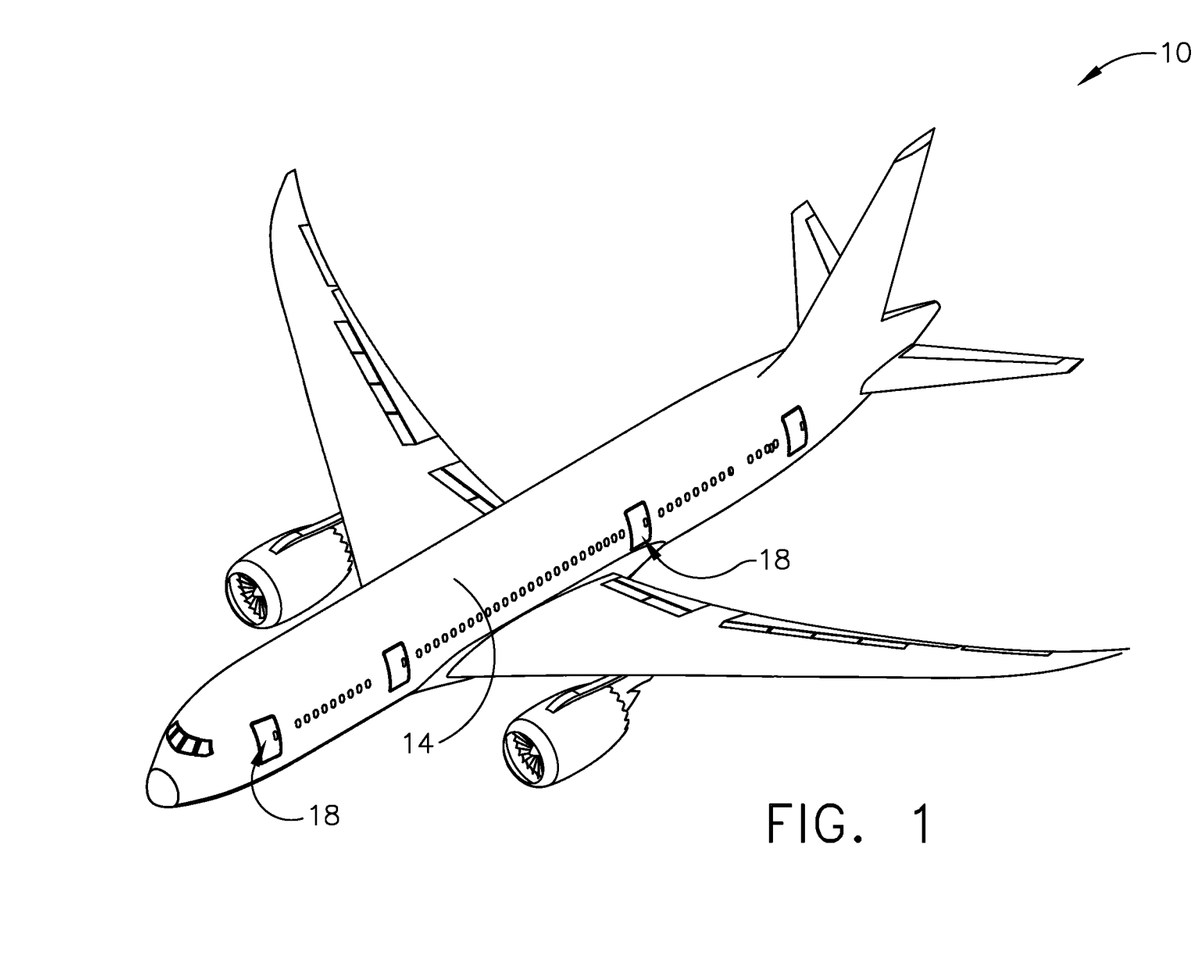
FIG. 1 is a perspective view of an aircraft.
Figure 2:
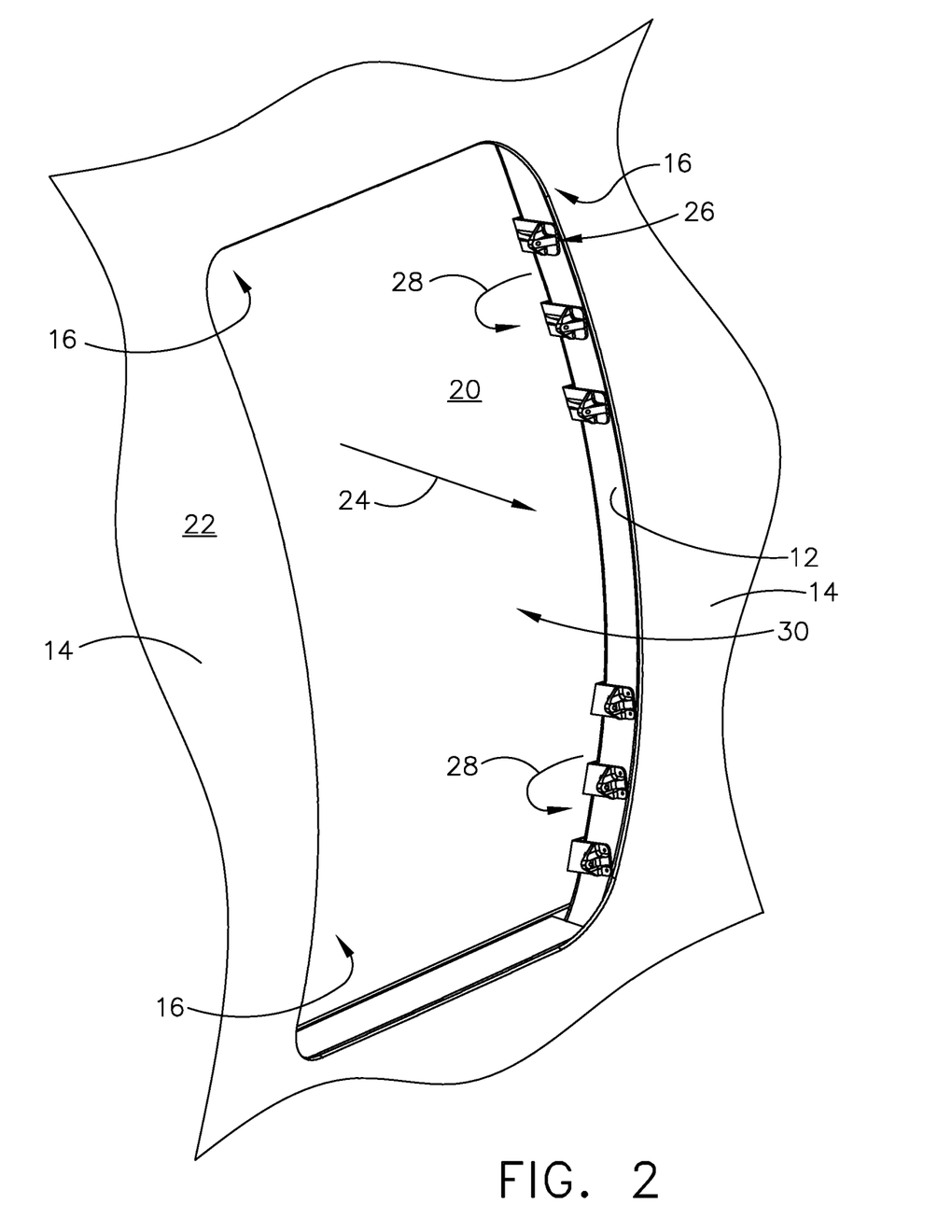
FIG. 2 is a partial perspective view from outside of the aircraft of a doorway of the aircraft, without a door, with frame stops secured to a door frame of the doorway associated with a first embodiment of a stabilization assembly for the door frame.

In referring to FIGS. 1 and 2, aircraft 10 has door frame 12, which is secured to fuselage skin 14 in one of a number of conventional ways which includes bolting in this example. Door frame 12 surrounds opening 16, defined by fuselage skin 14, and provides support to door 18 with door 18 in a closed position during flight operations. With aircraft 10 in flight operation a pressure differential is created between cabin 20 air pressure and outside 22 air pressure of aircraft 10. The pressure differential increases as the altitude of aircraft 10 increases and decreases as the altitude of aircraft 10 decreases. Because of the pressure differential, a resultant applied force is exerted in direction 24 from an interior of aircraft 10 or cabin 20 toward outside 22. First frame stop 26 is secured to door frame 12 and receives the applied force from a door stop (not shown), which is secured to door 18 and aligned with first frame stop 26 with door 18 in a closed position, as seen in FIG. 1. Typically, a number of frame stops are positioned spaced apart from one another positioned along door frame 12 wherein each frame stop aligns with a corresponding door stop secured to the door with the door in a closed position.

In this example, door stops of door 18 engage frame stops, such as frame stop 26, with the door stops positioned on cabin 20 side or inside of fuselage skin 14 relative to frame stop 26. Door stops face in this example toward outside 22 in engaging frame stops such as frame stop 26. The applied force exerted in direction 24 applies a shear force load onto door frame 12 in direction 24 through first frame stop 26. In addition, with frame stop 26 positioned extending into opening 16 and offset from door frame 12, the force being applied to frame stop 26 exerts an overturning moment to door frame 12 in rotational direction 28 originating within cabin 20 and extending in rotational direction 28 toward opening 16 of doorway 30, defined by fuselage skin 14, toward outside 22. As a result, door frame 12, which resists the shear force of the resultant applied force from the pressure differential, also needs to be stabilized to counter the overturning moment to maintain door frame 12 in operational position relative to door 18 and maintain proper alignment of frame stop 26 with a corresponding door stop.

As a result of the applied force, the resulting shear force and overturning moment being applied to door frame 12, a robust and heavy intercostal or rib assembly has been secured to door frame 12 to provide needed reinforcement. The intercostal was positioned to extend along cabin 20 side of fuselage skin 14 and is secured to an adjacent frame, which is secured to fuselage skin 14, such as adjacent frame 32 adjacent to door frame 12, as seen for example in FIGS. 3 and 4.

Figure 3:
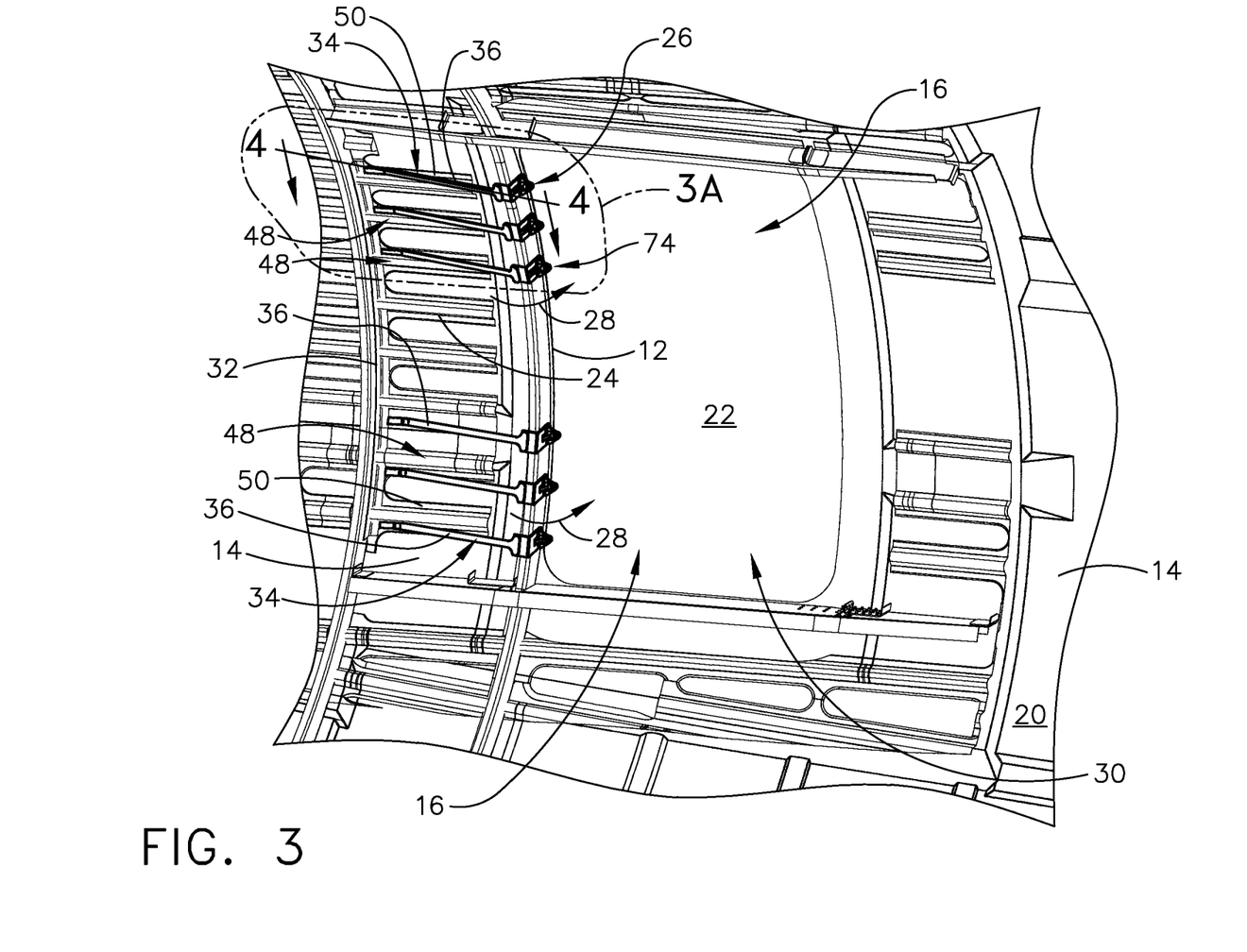
FIG. 3, is a partial perspective view of the doorway of FIG. 2, without a door, from inside of the aircraft showing the first embodiment of the stabilization assembly for the door frame.
Figure 3A:
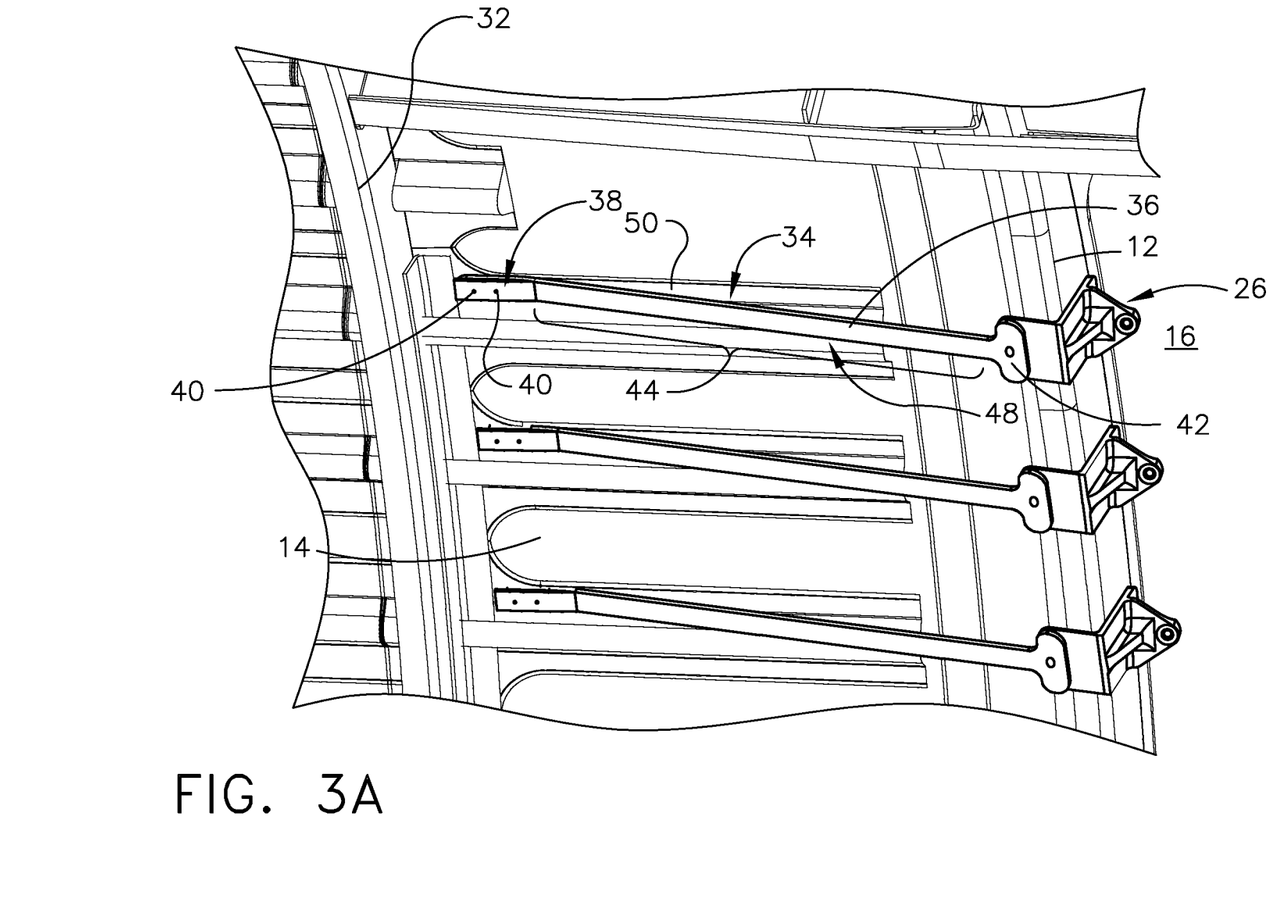
FIG. 3A is an enlarged view of that which is encircled and identified as 3A in FIG. 3.
Figure 4:
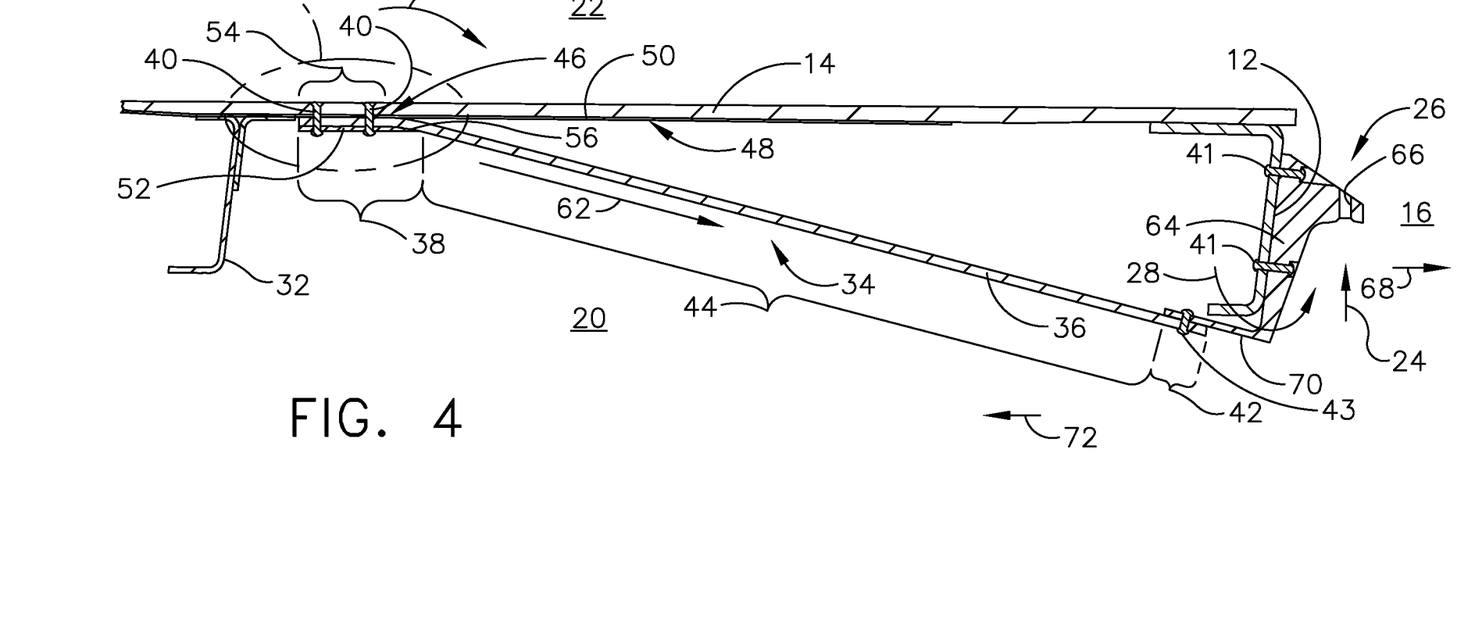
FIG. 4 is an enlarged cross section view along line 4-4 of FIG. 2 of the first embodiment of the stabilization assembly for the door frame.
Figure 4A:
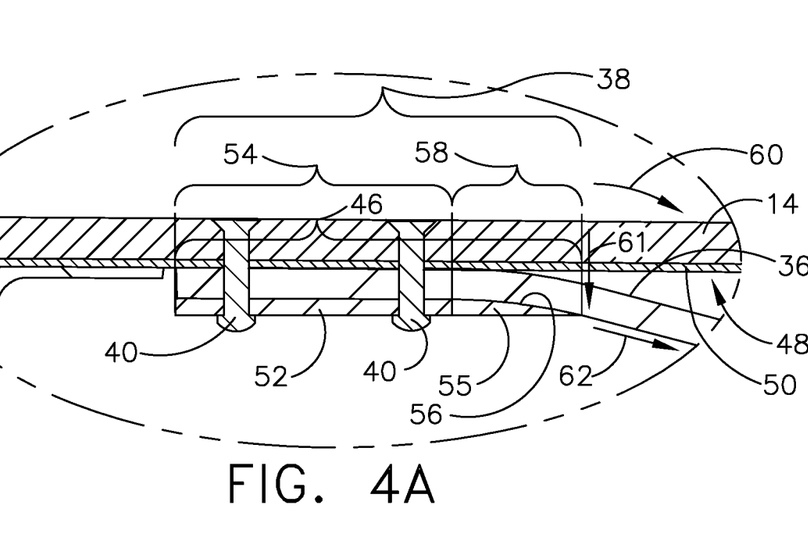
FIG. 4A is an enlarged view of that which is encircled in FIG. 4 and designated as 4A.
Figure 5:
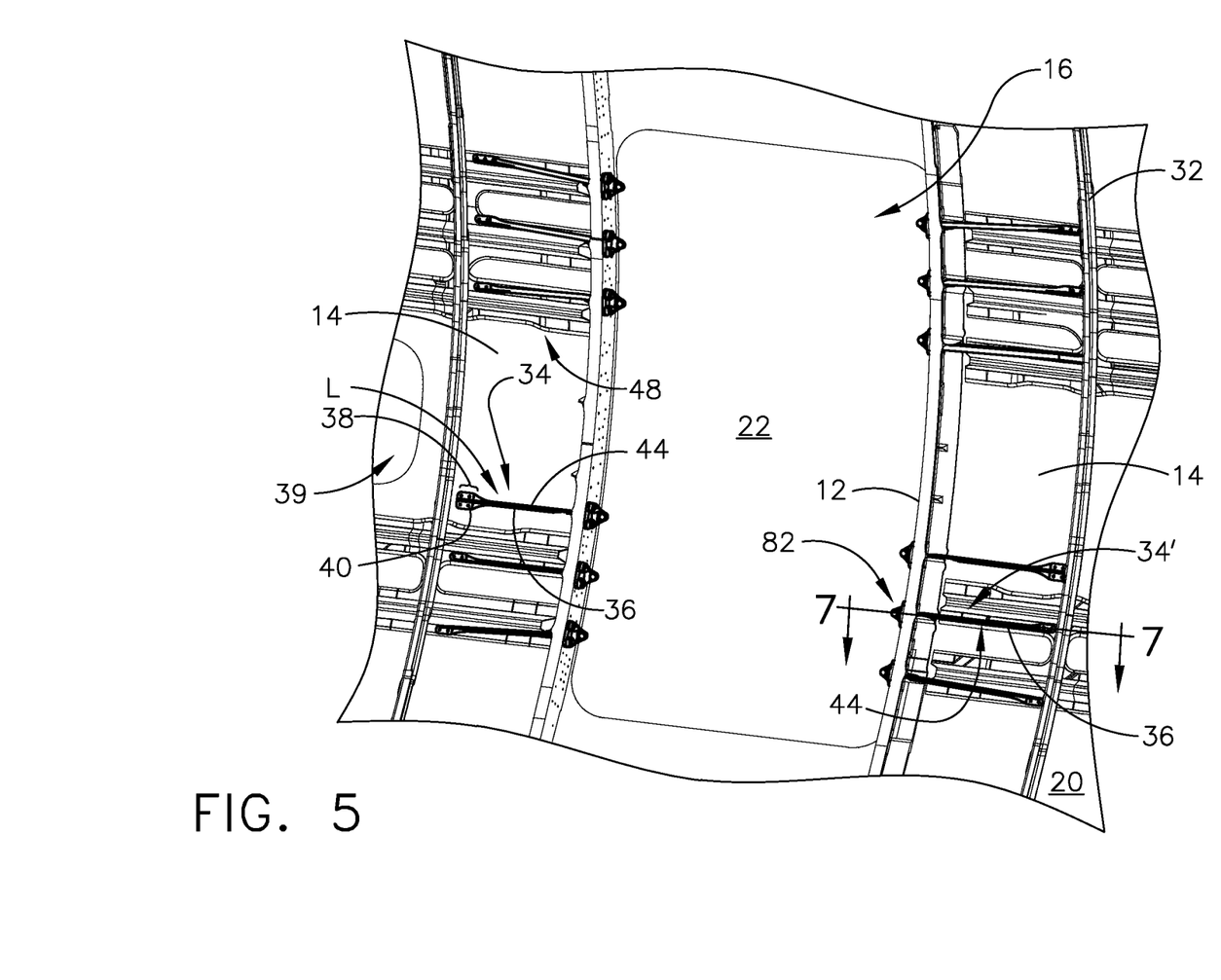
FIG. 5 is a partial perspective view of a doorway from inside of the aircraft showing a second embodiment of a stabilization assembly for the door frame.
Figure 6:
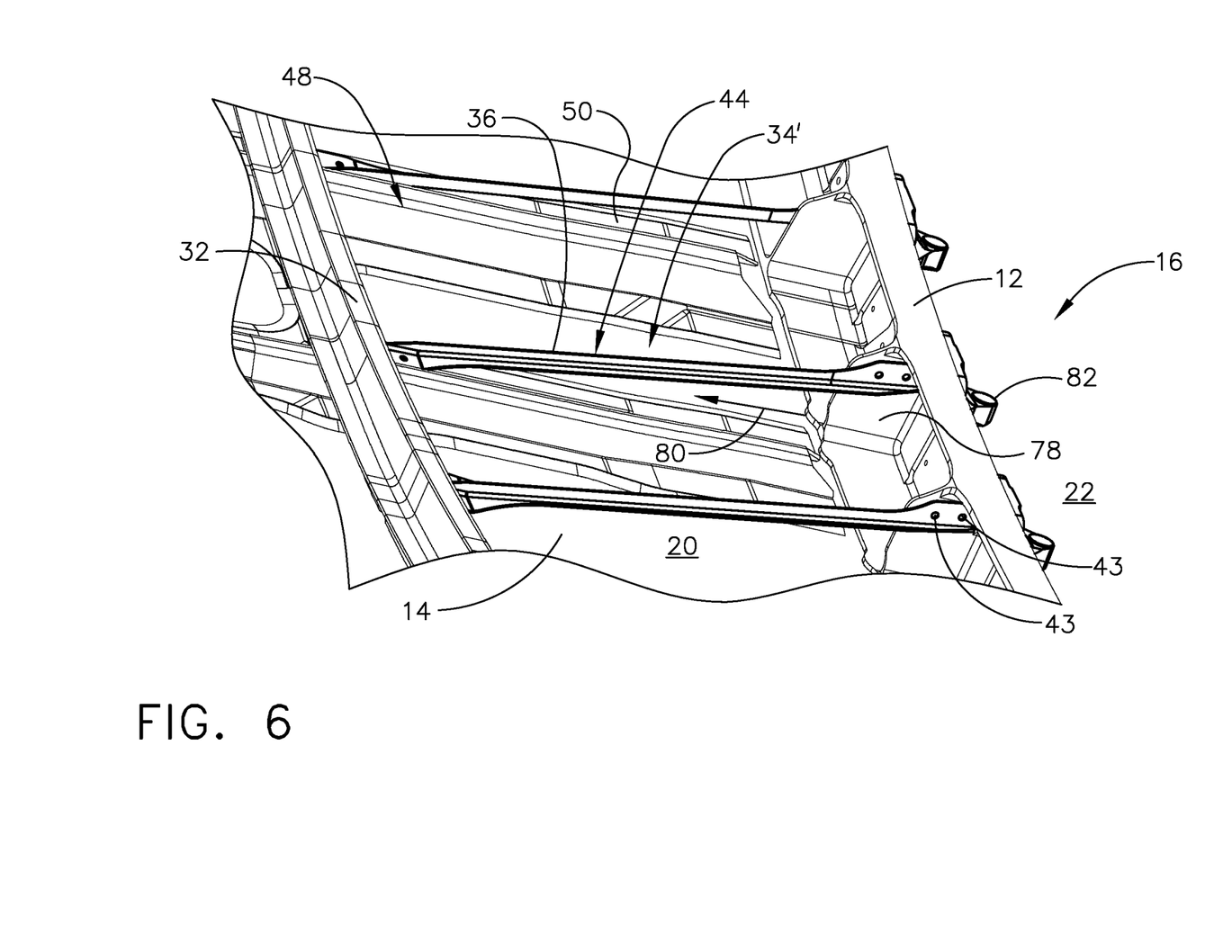
FIG. 6 is a partial enlarged view of the doorway from inside of the aircraft of FIG. 5 showing the second embodiment of the stabilization assembly for the door frame.
Figure 7:
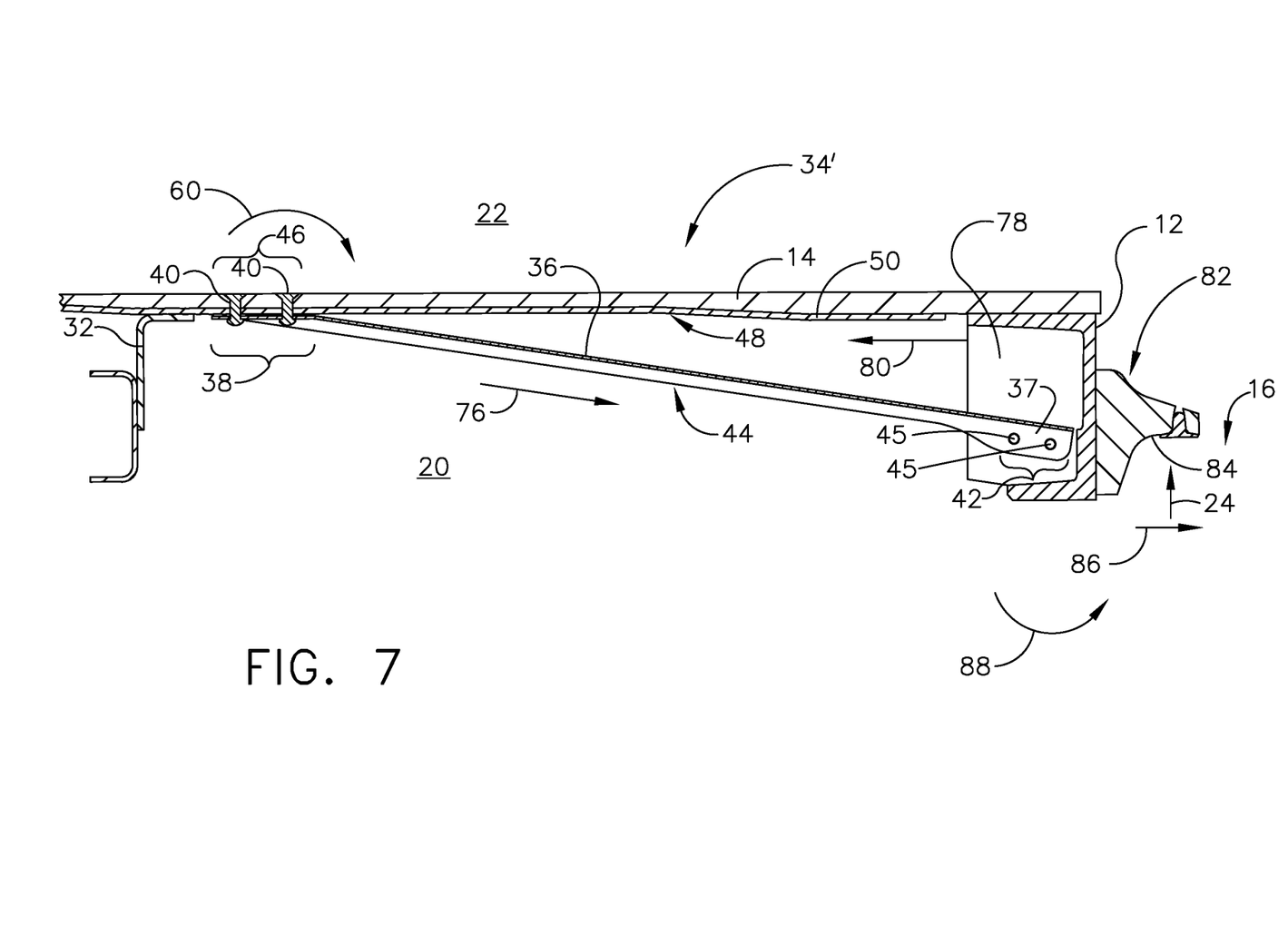
FIG. 7 is a cross section view along line 7-7 of FIG. 5 of the second embodiment of the stabilization assembly for the door frame.

The securement to adjacent frame 32 was needed based on the shear and overturning moment load the intercostal was resisting. An intercostal structure or rib was typically constructed having a web which extended radially from fuselage skin 14 to a height comparable to a height of door frame 12 and the web extended to adjacent frame 32. In contrast, first embodiment of stabilization assembly 34, as seen in FIGS. 3-4A and second embodiment of stabilization assembly 34', as seen in FIGS. 5-7 are shown with strap 36 having a relatively thin construction positioned spaced apart from fuselage skin 14 as strap 36 extends along fuselage skin 14 within cabin 20. As will be appreciated and discussed herein, strap 36 takes on a thinner smaller construction and having less weight than the intercostal with strap 36 taking on the overturning moment load placing strap 36 in tension and not taking on the shear load applied to door frame 12. Moreover, with strap 36 taking on less total load than the intercostal, strap 36 does not have to be secured to adjacent frame 32 but can instead be installed to fuselage skin 14. The installation of strap 36 to fuselage skin 14 presents less geometric challenges and is less time consuming and less costly to install than the installation of the intercostal structure to an adjacent frame 32.

In referring to first embodiment of stabilization assembly 34, as seen in FIGS. 3-4A, stabilization assembly 34 for door frame 12 is secured to fuselage 14 of aircraft 10 and coupled to door frame 12 wherein the door frame 12 is positioned about opening 16 defined in fuselage skin 14. Stabilization assembly 34 includes strap 36 with first end portion 38 of strap 36 secured to fuselage skin 14 with first fastener 40 which extends through first end portion 38 of strap 36 and through at least a portion of fuselage skin 14. First fastener 40 can include one or more fasteners as needed and in this example includes two bolts. Second end portion 42 of strap 36 is coupled to door frame 12 as will be discussed in further detail. Third portion 44 of strap 36 extends between first and second end portions 38, 42 of strap 36 and is spaced apart from fuselage skin 14.

Strap 36, in this first embodiment of stabilization assembly 34 and as well as for second embodiment of stabilization assembly 34', which will be discussed herein, is constructed with a unitary or single unit construction which is constructed of one of a composite laminate or a metal material. Strap 36 is constructed of a gauge or dimensions suitable for resisting the particular tension load experienced by strap 36 resisting overturning moment imparted to door frame 12. As discussed earlier, strap 36 is relatively lightweight in contrast to an intercostal wherein strap 36 provides at least ten to thirty percent (10%-30%) weight savings in contrast to intercostal utilization. This lighter weight construction can be used with strap 36 carrying a tension load and not carrying a shear load received by frame stop 26 and imparted on door frame 12. In use of either first or second embodiments of stabilization assemblies 34, 34', door frame 12 is constructed of one of a composite laminate material or a suitable aeronautical metal material. Also, strap 36 can be constructed of either laminate composite material or metal material. Examples of securing first end portions 38 of strap 36 and securement of second end portions 42 will be discussed herein for both first and second embodiments stabilization assemblies 34 and 34' with respect to the composition of strap 36.

With respect to utilizing laminate composite material for strap 36 for first and second stabilization assemblies 34 and 34', securement of first end portion 38 is shown in FIG. 4A and would be used for securement of first end portions 38 for both first and second stabilization assemblies 34 and 34' with strap 36 being constructed of laminate composite material. As seen in FIG. 4A, first end portion 38 of the strap 36, constructed of a composite laminate material, is positioned overlying portion 46 of stringer 48 with portion 46 of stringer 48 positioned between first end portion 38 of strap 36 and fuselage skin 14. First fastener 40 extends through portion 46 of stringer 48. In this example, portion 46 of stringer 48 includes flange 50 of a hat stringer. Stringer 48 can include one of a number of different configurations for stringers such as for example blade, "J", "I", "L" or "Z" stringers employed for reinforcement of fuselage skin 14 with portion 46 corresponding to a flange of one of these stringer configurations. Plate member 52 is constructed of a metallic or composite material which in this example is a titanium metal composition and is positioned overlying first portion 54 of first end portion 38 of strap 36. First portion 54 of first end portion 38 of strap 36 extends along portion 46 of stringer 48. First fastener 40 extends through plate member 52 securing plate member 52 to fuselage 14. Second portion 55 of plate member 52 has a portion machined in this example to form radially shaped surface 56 which abuts second portion 58 of first end portion 38 of strap 36. At least a portion of second portion 58 of first end portion 38 of strap 36 extends away from first portion 54 of first end portion 38 of strap 36 in curved direction 60 relative to first portion 54 of first end portion 38 of strap 36. With strap 36 in tension extending away from fuselage skin 14, strap 36 exerts a lifting or pulling away force to strap 36 pulling strap 36 in a direction 61 away from fuselage skin 14. Radially shaped surface 56 of second portion member 55 of plate member 52 accommodates strap 36 curving away from fuselage skin 14 and avoids placing a corner or an edge of second portion member 55 of plate member 52 abutting against strap 36 opposing direction 61 and reducing an occurrence of delamination of strap 36 that would be constructed of a composite laminate material. Alternatively with composite laminate strap 36 having first end portion 38 secured to fuselage skin 14 without the presence of stringer 48, such as in location L, as seen in for example with respect to strap 36 in FIG. 5 positioned in the vicinity of window 39, the securement is similar to the configuration shown and described for FIG. 4A but without flange 50 being present. In addition, fuselage skin 14 would be padded up to provide sufficient securement to strap 36 without the presence of stringer 48.

With respect to utilizing metal material for strap 36 for first and second stabilization assemblies 34 and 34', securement of first end portion 38 is shown in FIG. 7 and would be used for securement of first end portions 38 for both first and second stabilization assemblies 34 and 34' should strap 36 be constructed of metal material. The securement of first end portion 38 of strap 36 to fuselage skin 14 is shown in and described with respect to FIG. 7. In this example, With respect to stringer 48 being present, flange 50 will be positioned between first end portion 38 of strap 36, as seen in FIG. 7 with flange 50 positioned between first end portion 38 of strap 36 and fuselage skin 14. Strap 36, flange 50 and fuselage skin 14 are secured together with at least one fastener or bolt and in this example four fasteners or bolts 40 as seen in FIG. 5 wherein fasteners or bolts 40 would extend through strap 36, flange 50 and at least a portion of fuselage skin 14. Alternatively, with first end portion 38 of strap 36 constructed of metal material secured to fuselage skin 14 without the presence of stringer 48, such as in location L, as seen in FIG. 5 positioned in the vicinity of window 39, the securement is similar to the configuration shown in FIG. 7 but without flange 50 being present. In addition, fuselage skin 14 would be padded up to provide sufficient securement to first end portion 38 of strap 36 without the presence of stringer 48. Fasteners or bolts 40 would secure strap 36 and fuselage skin 14 together as earlier described.

With respect to second end portion 42 securement, third portion 44 of strap 36 constructed of laminate composite material extends away from second portion 58 of first end portion 38 of strap 36 in direction 62 forming an acute angle relative to fuselage skin 14, as seen in FIG. 4 of first embodiment of stabilization assembly 34. Third portion 44 of strap 36 constructed of metal material extents away from first end portion 38 of strap 36 in direction 76 forming an acute angle relative to fuselage skin 14, as seen in FIG. 7 of second embodiment of stabilization assembly 34'. Third portion 44 of strap 36 remains spaced apart from fuselage skin 14, as seen in both FIGS. 4 and 7, with third portion 44 of strap 36 extending in direction 62 toward a first embodiment of first frame stop 26, of first embodiment of stabilization assembly 34, secured to door frame 12, as seen in FIG. 4. In this first embodiment of stabilization assembly 34 first frame stop 26 is constructed of a suitable aeronautical metal material. First frame stop 26 includes body portion 64 secured to door frame 12 wherein in this example body portion 64 of frame stop 26 is bolted to door frame 12 with at least one bolt 41 and in this example two bolts 41. First portion 66 of first frame stop 26 extends in direction 68 away from body portion 64 and within opening 16 in fuselage skin 14. With first portion 66 extending into opening 16 in fuselage skin 14, first portion 66 of first frame stop 26 engages a door stop (not shown) of door 18 with door 18 in a closed position and receives the applied force from the pressure differentiation. The applied force is applied to first portion 66 of first frame stop 26 along direction 24. With application of applied force upon first portion 66 of first frame stop 26, the applied force is transmitted by first frame stop 26 to door frame 12 in the form of a shear force in direction 24 and an overturning moment, wherein the overturning moment is exerted along curved direction 28, with applied force being exerted along direction 24 offset from frame 12.

First frame stop 26 further includes second portion 70 which extends in direction 72 away from opening 16 in fuselage skin 14. Second portion 70 of first frame stop 26 is positioned to extend across and spaced apart from the door frame 12 as seen in FIG. 4. Second end portion 42 of strap 36 is secured to second portion 70 of first frame stop 26. In this example, second end portion 42 of strap 36 is bolted to second portion 70 of first frame stop 26 with at least one bolt 43. This securement of second end portion 42 of strap 36 can be employed in first embodiment of stabilization assembly 34 whether strap 36 is constructed of laminate composite or metal material. With second portion 70 of first frame stop 26 connected to strap 36, the overturning moment generated by the applied force exerted onto first portion 66 is resisted by strap 36 with placing strap 36 into tension. Door frame 12 resists the shear force transmitted from first portion 66 to door frame 12. As a result, in this example, door frame 12 is not required to resist both the overturning moment and the shear force which are exerted from the pressure differential experienced by door 18. As a result, as discussed earlier, a lighter structure of strap 36 can be employed to provide resistance to the overturning moment with tension while door frame 12 provides resistance to the shear force applied from first frame stop 26 and eliminates a need for a robust heavier intercostal to resist both the overturning moment and the shear force exerted onto door frame 12. In addition, with strap 36 taking on the overturning moment and not taking on the shear load in this example, strap 36 can be secured to fuselage skin 14 and stringer portion 46 without necessitating the geometric challenges of the connecting of an intercostal to an adjacent frame 32. Second frame stop 74, as seen in FIG. 3, is secured to door frame 12 positioned spaced apart along door frame 12 from first frame stop 26. Additional frame stops, as mentioned above, and associated stabilization assemblies 34 are positioned spaced apart along door frame 12 as needed.

In referring to FIGS. 5-7, second embodiment of stabilization assembly 34' is shown wherein third portion 44 of strap 36 remains spaced apart from fuselage skin 14. Third portion 44 of strap 36 extends, as earlier mentioned, in direction 76 toward web 78 secured to door frame 12. Web 78 extends in direction 80 away from opening 16 of fuselage skin 14. Second end portion 42 of the strap 36 can be secured to web 78 with at least one bolt 43 and in this example two bolts 45 are employed. In this example, strap 36 whether constructed of composite laminate material or metal material includes plate portion 37 which is configured to extend along web 78. Plate 37 extends in a transverse direction with respect to fuselage skin 14, to provide a compatible and stable securement of second end portion 42 of strap 36 with web 78. In other examples, second end portion 42 of strap 36 can be secured to other selected locations with respect to other portions of door frame 12. Web 78, in this example, is forged with door frame 12. In other examples, door frame 12 can be constructed of laminate material. Web 78 in other examples can be secured to door frame 12 by one of number of conventional ways of securement. Further included is third frame stop 82 secured to the door frame 12 wherein portion 84 of the third frame stop 82 extends in direction 86 away from door frame 12 within opening 16 of fuselage skin 14. In this example, web 78 is aligned with third frame stop 82 resulting in third frame stop 82 being in alignment with strap 36, as seen in FIG. 7. In other example configurations can be selected which can include (not shown) frame stop 82 being positioned out of alignment with web 78 and out of alignment of strap 36. In this configuration, portion 84 of third frame stop 82 receives applied force from direction 24 from door 18 and a resulting shear force and overturning moment are transmitted from third frame stop 82 to door frame 12. In this example, third frame stop 82 is forged with door frame 12. A number of frame stops can be positioned spaced apart from one another positioned along door frame 12 wherein each frame stop aligns with a corresponding door stop secured to door 18 with door 18 in a closed position.

With strap 36 secured to web 78 of door frame 12 with one or more bolts and in this example two bolts 45 are employed. In this example, strap 36 resists overturning moment directed in curved direction 88 with strap 36 going into tension. Door frame 12 resists the shear force transmitted from third frame stop 82. As a result, similar to the first embodiment of stabilization assembly 34, the second embodiment of stabilization assembly 34' door frame 12 is not required to be supported by a heavier intercostal structure to resist both the shear force and overturning moment transmitted from third frame stop 82. In this example, strap 36 resists the overturning moment with tension experienced in strap 36 and the shear force is resisted by door frame 12. As a result, as mentioned earlier, strap 36 is constructed to be lighter in weight than with the previous use of an intercostal. In addition strap 36, with carrying less load than the intercostal, can be installed into fuselage skin 14 providing less geometric challenges to installation than the installation of the intercostal to adjacent frame 32. Installation of strap 36 to fuselage skin 14 takes less time and is less expensive than the installation of the intercostal.

Figure 8:
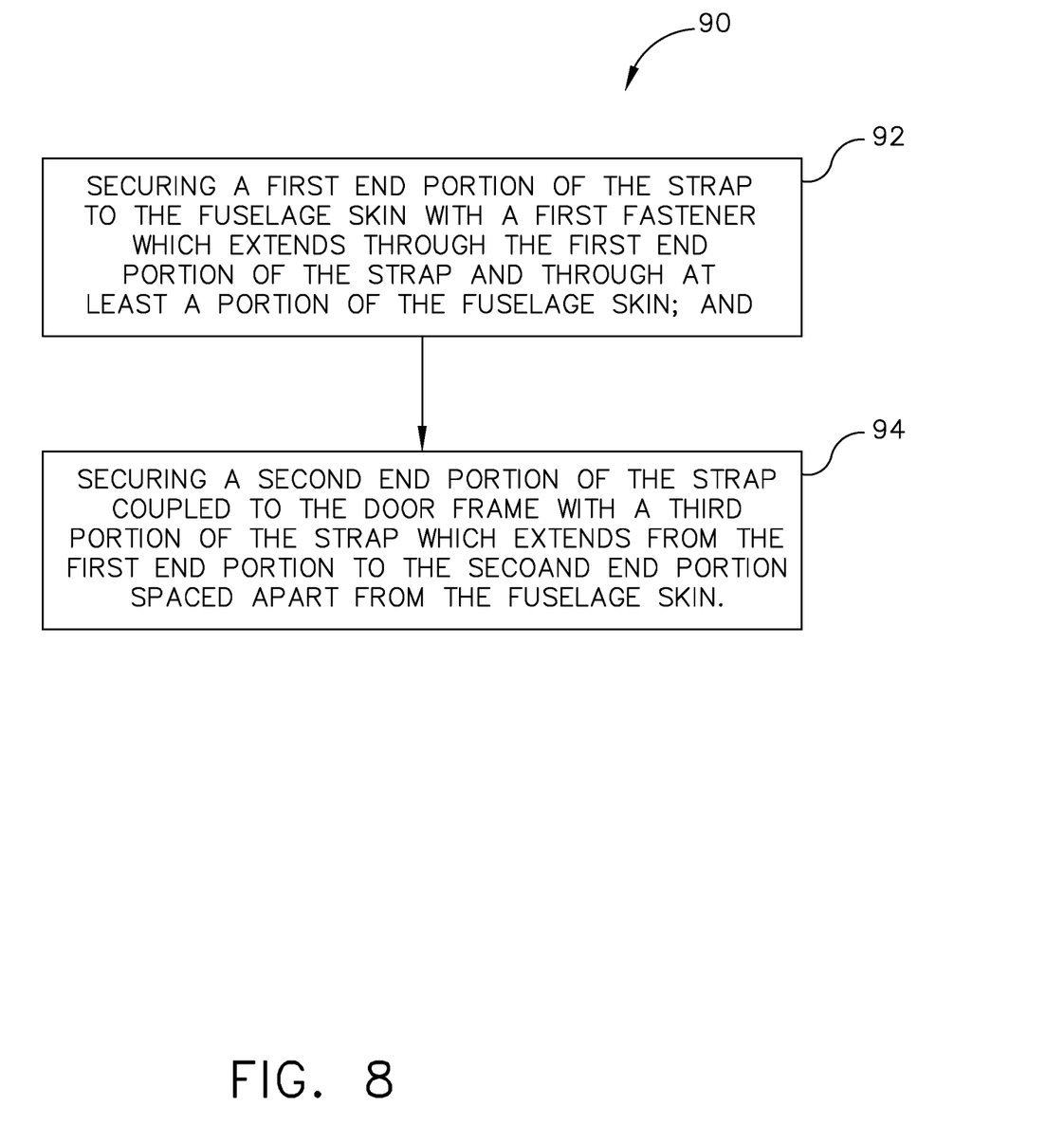
FIG. 8 is a flow chart of a method for stabilizing a door frame.

A method 90 as seen in FIG. 8, is shown for stabilizing door frame 12 secured to fuselage skin 14 of aircraft 10 and positioned about opening 16 defined in fuselage skin 14. Method 90 includes step 92 of securing first end portion 38 of strap 36 to fuselage skin 14 with first fastener 40 which extends through first end portion 38 of strap 36 and through at leat a portion of fuselage skin 14. Method 90 further includes step 94 of securing second end portion 42 of strap 36 coupled to door frame 12 with third portion 44 of strap 36 which extends from first end portion 38 to second end portion 42 spaced apart from fuselage skin 14, as also seen in FIGS. 4 and 7 which include the first and second embodiments of stabilization assemblies 34 and 34'.

Step 92 of securing first end portion 38 of strap 36 to fuselage skin 14 includes positioning portion 46, in this example flange 50, of stringer 48 between first end portion 38 of strap 36 and fuselage skin 14, as seen in FIGS. 4A and 7 for first and second embodiments of stabilization assemblies 34 and 34'. Strap 36 can be constructed of either laminate composite material or metal material and in FIGS. 4 and 4A strap 36, as an example, is constructed of laminate composite material and in FIG. 7 strap 36, as an example is constructed of a metal material. In the example, as shown in FIGS. 4 and 4A, with strap 36 constructed of laminate composite material, step 92 of securing first end portion of strap 36 to fuselage 14 includes positioning plate member 52 overlying first end portion 38 of strap 36 with plate member 52 including radially shaped surface 56 positioned facing strap 36. In this configuration, step 92 further includes positioning first fastener 40 to extend through plate member 52. It can be noted that with strap 36 being constructed of metal material, as seen in FIG. 7, plate member 52 with radially shaped surface 56 is not required since plate member 52 and radius shaped member are used with respect to reducing the occurrence of delamination of laminate composite material.

Step 92 of securing first end portion 38 of strap 36 to fuselage skin 14 can also include securement occurring in location L, as seen for example in FIG. 5, of fuselage skin 14 where stringer 48 is not positioned. Without the opportunity of connecting to stringer 48, additional anchoring support is provided in location 48 of padding up fuselage skin 14. As a result, step 92 of securing, without stringer 48 being available, first end portion 38 to fuselage skin 14 includes positioning first end portion 38 of strap 36 to be positioned in overlying contact with fuselage skin 14 (not shown) but would take the similar configuration as shown in FIGS. 4A and 7 but without the presence of flange 50. Step 92 of securing first end portion 38 with strap 36 constructed of laminate composite material further includes positioning plate member 52, as seen in FIG. 4A, overlying the first end portion 38 of strap 36 with plate member 52 including radially shaped surface 56 positioned facing strap 36. In addition, step 92 further includes positioning first fastener 40 to extend through plate member 52.

Method 90 further includes step 94 of securing second end portion 42 of strap 36 coupled to door frame 12 includes securing second end portion 42 of strap 36 to first frame stop 26 with first frame stop 26 secured to door frame 12, as seen for example in FIG. 4. As mentioned earlier. Strap 36 in this example as shown in FIG. 4 can be constructed of either laminate composite material or metal material in making securement at second end portion 42 of strap 36. Step 94 of securing second end portion 42 of strap 36 coupled to door frame 12 includes securing second end portion of strap 36 to web 78 of door frame 12 as seen for example in FIG. 7. Securement as shown in second end portion of strap 36 to web 78 can be made in this configuration whether strap 36 is constructed of laminate composite material or metal material.

While various embodiments have been described above, this disclosure is not intended to be limited thereto. Variations can be made to the disclosed embodiments that are still within the scope of the appended claims.

What is claimed:

1. A stabilization assembly for a door frame secured to a fuselage skin of an aircraft and positioned about an opening defined in the fuselage skin, comprising:
   a strap, wherein:
      a first end portion of the strap is secured to the fuselage skin with a first fastener which extends through the first end portion of the strap and through at least a portion of the fuselage skin;
      a second end portion of the strap is coupled to the door frame; and
      a third portion of the strap extends between the first and second end portions of the strap and spaced apart from the fuselage skin.

2. The stabilization assembly of claim 1, wherein the strap has a unitary construction.

3. The stabilization assembly of claim 2, wherein the strap is constructed of one of a composite laminate material or a metal material.

4. The stabilization assembly of claim 1, wherein the door frame is constructed of one of a composite laminate material or a metal material.

5. The stabilization assembly of claim 1, wherein:
   the first end portion of the strap is positioned overlying a portion of a stringer with the portion of the stringer positioned between the first end portion of the strap and the fuselage skin; and
   the first fastener extends through the portion of the stringer.

6. The stabilization assembly of claim 5, wherein the portion of the stringer comprises a flange of the stringer.

7. The stabilization assembly of claim 5, further includes a plate member positioned overlying a first portion of the first end portion of the strap, wherein:
   the first portion of the first end portion of the strap extends along the portion of the stringer; and
   the first fastener extends through the plate member securing the plate member to the fuselage skin.

8. The stabilization assembly of claim 7, wherein the plate member comprises a radially shaped surface, wherein the radially shaped surface abuts a second portion of the first end portion of the strap.

9. The stabilization assembly of claim 8, wherein at least a portion of the second portion of the first end portion of the strap extends away from the first portion of the first end portion of the strap in a curved direction relative to the first portion of the first end portion of the strap and away from the fuselage skin.

10. The stabilization assembly of claim 1, wherein the third portion of the strap extends away from second portion the first end portion of the strap in a direction forming an acute angle relative to the fuselage skin.

11. The stabilization assembly of claim 10, wherein the third portion of the strap remains spaced apart from the fuselage skin with the third portion of the strap extending in a direction toward a first frame stop secured to the door frame.

12. The stabilization assembly of claim 11, wherein:
   the first frame stop includes a body portion secured to the door frame; and
   a first portion of the first frame stop extends in a direction away from the body portion and within the opening in the fuselage skin.

13. The stabilization assembly of claim 12, wherein the first frame stop further includes a second portion which extends in a direction away from the opening in the fuselage skin.

14. The stabilization assembly of claim 13, wherein the second portion of the first frame stop is positioned to extend across and spaced apart from the door frame.

15. The stabilization assembly of claim 14 wherein the second end portion of the strap is secured to the second portion of the first frame stop.

16. The stabilization assembly of claim 11 further including a second frame stop secured to the door frame positioned spaced apart along the door frame from the first frame stop.

17. The stabilization assembly of claim 10, wherein the third portion of the strap remains spaced apart from the fuselage skin with the third portion of the strap extending in a direction toward a web of the door frame.

18. The stabilization assembly of claim 17, wherein the web extends in a direction away from the opening of the fuselage skin.

19. The stabilization assembly of claim 17, wherein the second end portion of the strap is secured to the web.

20. The stabilization assembly of claim 17, further including a third frame stop secured to the door frame wherein a portion of the third frame stop extends in a direction away from the door frame within the opening of the fuselage skin.

21. A method for stabilizing a door frame secured to a fuselage skin of an aircraft and positioned about an opening defined in the fuselage skin, comprising steps of:
   securing a first end portion of a strap to the fuselage skin with a first fastener which extends through the first end portion of the strap and through at least a portion of the fuselage skin; and
   securing a second end portion of the strap coupled to the door frame with a third portion of the strap which extends from the first end portion to the second end portion spaced apart from the fuselage skin.

22. The method of claim 21, wherein the step of securing the first end portion of the strap to the fuselage skin includes positioning a portion of a stringer between the first end portion of the strap and the fuselage skin with the first fastener extending through the portion of the stringer.

23. The method of claim 22, wherein with the strap constructed of a composite laminate material, the step of securing the first end portion of the strap to the fuselage skin includes:
   positioning a plate member overlying the first end portion of the strap with the plate member comprising a radius shaped surface positioned facing the strap; and
   positioning the first fastener to extend through the plate member.

24. The method of claim 21, wherein the step of securing the first end portion of the strap to the fuselage skin includes positioning the first end portion of the strap to be positioned in overlying contact with the fuselage skin.

25. The method of claim 24, wherein the step of securing the first end portion of the strap to the fuselage skin, with the first end portion of the strap constructed of a composite laminate material, includes:
   positioning a plate member overlying the first end portion of the strap with the plate member comprising a radius shaped surface positioned facing the strap; and
   positioning first fastener to extend through the plate member.

26. The method of claim 21, wherein the step of securing the second end portion of the strap coupled to the door frame includes securing the second end portion of the strap to a first frame stop with the first frame stop secured to the door frame.

27. The method of claim 21, wherein the step of securing the second end portion of the strap coupled to the door frame includes securing the second end portion of the strap to a web of the door frame.

* * * * *